US008479017B2

(12) United States Patent
Zimmer et al.

(10) Patent No.: US 8,479,017 B2
(45) Date of Patent: Jul. 2, 2013

(54) SYSTEM AND METHOD FOR N-ARY LOCALITY IN A SECURITY CO-PROCESSOR

(75) Inventors: Vincent J. Zimmer, Federal Way, WA (US); Michael A. Rothman, Puyallup, WA (US); Robert C. Swanson, Olympia, WA (US); Palsamy Sakthikumar, Puyallup, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 12/819,933

(22) Filed: Jun. 21, 2010

(65) Prior Publication Data

US 2011/0314298 A1 Dec. 22, 2011

(51) Int. Cl.
*G06F 21/00* (2006.01)
(52) U.S. Cl.
USPC ............ 713/189; 713/178; 713/192; 713/194
(58) Field of Classification Search
USPC .................................. 713/189, 178, 192, 194
See application file for complete search history.

(56) References Cited

U.S. PATENT DOCUMENTS

| 7,076,655 | B2 | 7/2006 | Griffin et al. | |
|---|---|---|---|---|
| 2002/0097681 | A1* | 7/2002 | Treister et al. | 370/238 |
| 2002/0180586 | A1 | 12/2002 | Kitson et al. | |
| 2005/0133582 | A1 | 6/2005 | Bajikar | |
| 2006/0190986 | A1 | 8/2006 | Mont et al. | |
| 2007/0226496 | A1 | 9/2007 | Maletsky et al. | |
| 2007/0240197 | A1* | 10/2007 | Blumenthal et al. | 726/1 |
| 2007/0256125 | A1 | 11/2007 | Chen et al. | |
| 2007/0266256 | A1* | 11/2007 | Shah et al. | 713/178 |
| 2008/0182592 | A1* | 7/2008 | Cha et al. | 455/456.3 |
| 2009/0089582 | A1 | 4/2009 | Brutch et al. | |

OTHER PUBLICATIONS

International Search Report and Written Opinion received for PCT Patent Application No. PCT/US2011/041294, mailed on Jan. 2, 2012, 9 pages.
Extended European Search Report received for European Patent Application No. 11169089.7, mailed Nov. 15, 2011, 6 pages.
Azema et al., "M-Shield™ Mobile Security Technology: making wireless secure", Texas Instruments White Paper, Feb. 2008, pp. 1-6.
"IBM PCI Cryptographic Coprocessor", Retrieved on May 14, 2010, Web page available at:—http://www-03.ibm.com/security/cryptocards/pcicc/overview.shtml.
Preliminary Rejection, mailed Nov. 12, 2012 for Korean Patent Application No. 2011-0060195, 8 pages.

* cited by examiner

*Primary Examiner* — Andrew Georgandellis
(74) *Attorney, Agent, or Firm* — Schwabe, Williamson & Wyatt, P.C.

(57) ABSTRACT

Enhancing locality in a security co-processor module of a computing system may be achieved by including one or more additional attributes such as geographic location, trusted time, a hardware vendor string, and one or more environmental factors into an access control space for machine mode measurement of a computing system.

30 Claims, 4 Drawing Sheets

SYSTEM AND METHOD FOR N-ARY LOCALITY IN A SECURITY CO-PROCESSOR

BACKGROUND

1. Field

The present invention relates generally to computer security and trusted computing, and more specifically, to expanding locality in a computing system environment.

2. Description

Current security co-processor modules (such as trusted platform modules (TPMs), for example), provide support for the concept of locality. Locality typically means that there is an identification of a software environment present in a computing system corresponding with a "machine mode" of the system. Machine modes can include one or more of the version of microcode running on the system, regular macrocode (e.g., the Basic Input/Output System (BIOS), and a static operating system (OS)), a trusted operational environment (e.g., a hypervisor from a third party to support trusted execution technologies), and other hardware-driven indicia.

The security co-processor module is typically used to provide security operations for software running on the computing system. Binding of the software environment with the machine mode can be used to provide additional security. However, limiting system operations using only the machine mode binding may be insufficient in some circumstances.

BRIEF DESCRIPTION OF THE DRAWINGS

The features and advantages of the present invention will become apparent from the following detailed description of the present invention in which.

DETAILED DESCRIPTION

Figure 1:
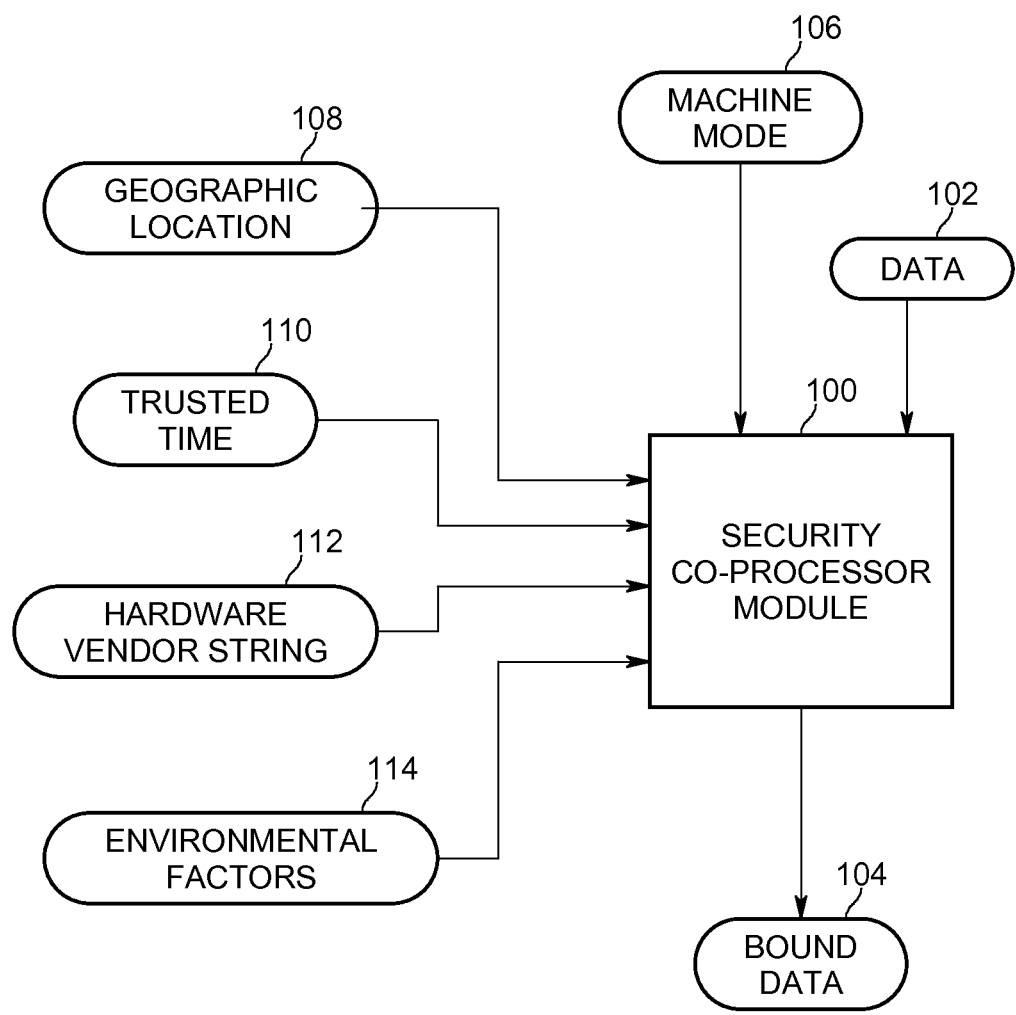
FIG. 1 is a diagram of data input to a security co-processor module for enhanced locality according to an embodiment of the present invention.

One of the features provided for in a trusted computing system is obtaining a measurement of the current environment of the computing system. This measurement includes, at least in part, a cryptographic hash of the firmware and the operating system (OS). The measurement may also include hashes of other software components. The measurement may be used for sealed storage and can also be used for reporting on the environment to an external party. The current environment may also be known as the machine mode.

Embodiments of the present invention enhance the security co-processor module and the concept of locality based on machine mode by including additional attributes in the measurement of the current environment of the computing system. The result of using additional attributes is that overall security and control of the computing system may be improved. In embodiments of the present invention, a security co-processor module processes the additional attributes when determining the measurement. The additional attributes for purposes of measurement in this context are not handled by other software executing on the computing system (e.g., application programs, the OS, or BIOS). This avoids having vulnerable, higher level software participate in measurement using the additional attributes and expose possible attack points to a hacker. In at least one embodiment where the security co-processor module comprises a Trusted Platform Module (TPM), this means that operations relating to generation and use of the measurement are inside the well-specified, hardware-bounded trusted computing base (TCB) of the TPM. The TPM provides protected storage, execution, and a well defined enrollment/registration mechanism.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

One embodiment of the present invention defines a broad access control space S, S having one or more sets $S\_i$, where the locality attributes comprise an N-tuple of <Machine Mode M, Trusted Time T, Location L>, or <$M\_i, T\_i, L\_i$> for all values of i. That is, the current trusted time and the current geographic location of the computing system may be included with the machine mode in the measurement. The value i may indicate a selected one of a set of measurements in the access control space S. Each $S\_i$ in S may indicate an acceptable combination of machine mode, trusted time, and location whereby further operations of the computing system by higher level software (such as the OS and application programs) may be performed.

In an embodiment of the present invention, the access control space S may be further extended to include another information item called a hardware vendor string. The hardware vendor string may comprise a bit string of arbitrary length and composition, and may uniquely identify one or more of the hardware vendor of the computing system, the security co-processor module, the processor of the computing system, and/or other hardware system components.

In one embodiment, the hardware vendor string may be used by the security co-processor for attestation purposes. The access control space S in this embodiment may be <Machine Mode M, Trusted Time T, Location L, Hardware Vendor String HVS>, or <$M\_i, T\_i, L\_i, HSV\_i$> for all values of i.

In another embodiment of the present invention, the access control space S may be further extended to include additional attributes such as environmental factors. Environmental factors may include such data items as temperature, acceleration, capacitance, elevation, and orientation of the computing system. Other environmental factors may also be included. In one embodiment, the environmental factors may be used by the security co-processor module for assisting in controlling the use of the computer system. The access control space S in this embodiment may be <Machine Mode M, Trusted Time T, Location L, Hardware Vendor String HVS, Environmental Factors EF>, or <$M\_i, T\_i, L\_i, HSV\_i, EF\_i$> for all values of i. Environmental Factors may include one or more of the attributes listed above (temperature, acceleration, capacitance, elevation, and orientation).

One skilled in the art will recognize that, depending on the implementation, access control space S may comprise any combination of the above identified attributes.

FIG. 1 is a diagram of data input to a security co-processor module for enhanced locality according to an embodiment of the present invention. Security co-processor module 100 provides trusted computing services and operations to a computing system. In one embodiment, security co-processor module 100 comprises a Trusted Platform Module (TPM). In other embodiments, other types of security co-processor modules may be used. For example, other security co-processors include the International Business Machines (IBM) 4758 PCI Cryptographic Co-Processor, commercially available from IBM, and the Texas Instruments (TI) M-Shield, commercially available from TI. A TPM has been defined by the Trusted Computing Group (TCG) in the Trusted Computing Platform Association (TCPA) Main Specification 1.2, February 2002, and successive versions, available from the TCG. A TPM operates somewhat like a "smart card" on a motherboard of a computing system (such as a desktop or laptop personal computer (PC), a mobile computing device, a cellular phone, or other computing device), to provide various security functions to the system. There is usually only one TPM per system. The TPM includes at least one public/private key pair for use in cryptographic operations, can generate anonymous key pairs for use by other entities within the system, can perform encryption and decryption operations, can sign and verify data, and can establish a root of trust for the system. The TPM is considered to be difficult to break into and affect its operations. The TPM, which is used as a root of trust for a computing platform, has a set of Platform Configuration Registers (PCRs), and at least one public/private key pair. During the boot of a trusted computing environment, a root of trust component will load a software module, compute the hash of the software module, send the hash to a PCR, and then transfer control to that software module. The software module may then repeat this process with a new software module, and may send the hash of the new software module to a new PCR, or it may extend the hash of a PCR that was previously used. This process may be repeated many times. In the end, there are one or more PCRs that have a measurement of all the software that is in control of the trusted computing environment.

Sealed storage is one of the features of a trusted computing platform. The TPM may encrypt a portion of data called a blob, which consists of a set of PCR values and a secret. Later, when the blob is presented to the TPM for decryption, the TPM will decrypt it, and check whether the PCR values specified in the blob are the same as the PCR values that are currently stored in the PCRs in the TPM. Only if this check passes will the TPM release the decrypted secret to the platform. Thus the sealed secret is only available to the computing environment specified by the blob. If some other environment has launched on the computing platform, then the TPM will not release the secret.

In one embodiment, when the processing system is booted up, during the boot sequence measurements of various software components (such as the BIOS, option ROMs, and so on) may be registered into one or more PCRs. This is known as the machine mode. In one embodiment, the measurement comprises a cryptographic hash of the code of one or more of the software components.

In order to bind data to a current machine mode, security co-processor module 100 accepts machine mode 106 and data 102 as input data. Using known cryptographic operations, the security co-processor module binds the machine mode to the data to produce bound data 104. Other software components may then infer trust in the bound data due to the security co-processor module's operations.

To improve security and control of the computing system, additional attributes may be included as data input to the security co-processor module in embodiments of the present invention. Geographic location 108 may be included as an attribute in the access control space. A current geographic location of the computing system may be obtained from a global positioning system (GPS) component of the computing system according to well known methods. The current geographic location of the computing system may be used to control operations of the computing system depending on where the system is and what rules have been set up by a system administrator regarding location and system usage.

Trusted time 110 may also be included as an attribute in the access control space. Obtaining a value for time that can be trusted in a computing system is desirable. For example, trusted time may be used in conjunction with other processing to improve the robustness of content protection mechanisms to assure that premium content is available for the digital home. It may be used in a content protection environment to assure that the computing platform owner downloads a revocation list of compromised keys on a periodic basis. It may also be used to provide a secure way to enable content to be purchased for access during a temporary time window. However, if the time value can be modified by an unscrupulous user without detection by the computing system, then computer security and content protection systems may be compromised. One solution to providing trusted time requires that a battery be contained in the TPM that cannot be easily removed by the user (such as described in Trusted Platform Module (TPM) Main part 1 Design Principles, Specification Version 1.2, Revision 81, Nov. 23, 2004, pp. 93-98, available from the Trusted Computing Group). In one embodiment, trusted time may be provided as disclosed in the US patent application entitled "Method for Providing Trusted Time in a Computing Platform" by Ernie F. Brickell and Clifford D. Hall, filed Sep. 23, 2005, as Ser. No. 11/233,543, and incorporated herein by reference.

A hardware vendor string 112 may also be included as an attribute in the access control space. As noted above, the hardware vendor string may comprise a bit string of arbitrary length and composition, and may uniquely identify one or more of the hardware vendor of the computing system, the security co-processor module, the processor of the computing system, and/or other hardware system components.

One or more environmental factors 114 may also be included as attributes in the access control space. Environment conditions such as temperature, acceleration, capacitance, elevation, and orientation of the computing system may be determined and/or sensed by appropriate known devices and sensors and input to the security co-processor module.

Figure 2:
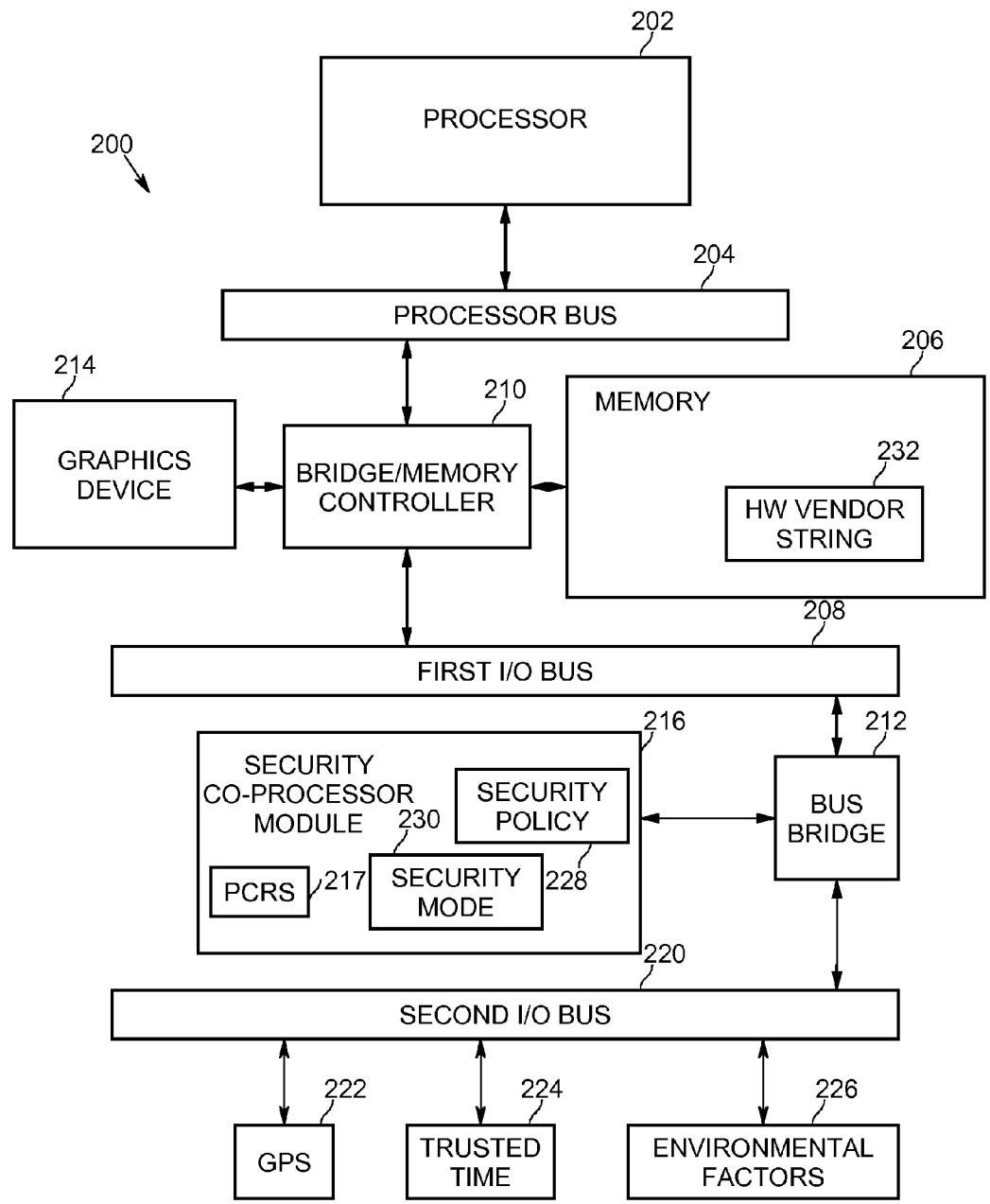
FIG. 2 is a diagram illustrating a processing system having a security co-processor module according to an embodiment of the present invention.

An exemplary computing system for embodiments of the present invention is shown in FIG. 2, however, other systems may also be used and not all components of the computing system shown are required for the present invention. Sample computing system 200 may be used, for example, to execute the processing for embodiments of the present invention. Sample system 200 is representative of processing systems based on the PENTIUM®, CORE, CORE DUO, CORE QUAD, or Celeron® family of processors available from Intel Corporation, although other systems (including personal computers (PCs) or servers having other processors, engineering workstations, other set-top boxes, mobile computing devices, handheld computing devices, cellular phones, and the like) and architectures may also be used.

FIG. 2 is a block diagram of a system 200 of one embodiment of the present invention. The system 200 includes a processor 202 that processes data signals. Processor 202 may be coupled to a processor bus 204 that transmits data signals between processor 202 and other components in the system 200. System 200 includes a memory 206. Memory 206 may store instructions and/or data represented by data signals that may be executed by processor 202. The instructions and/or data may comprise code for performing any and/or all of the techniques of the present invention. Memory 206 may also contain additional software and/or data such as hardware vendor string 232.

A bridge/memory controller 210 may be coupled to the processor bus 204 and memory 206. The bridge/memory controller 210 directs data signals between processor 202, memory 206, and other components in the system 200 and bridges the data signals between processor bus 204, memory 206, and a first input/output (I/O) bus 208. In this embodiment, graphics device 214 interfaces to a display device (not shown) for displaying images rendered or otherwise processed by the graphics device 214 to a user. First I/O bus 208 may comprise a single bus or a combination of multiple buses. First I/O bus 208 provides communication links between components in system 200.

In at least one embodiment, a security co-processor module 216 (such as a TPM, for example) may be coupled to bus bridge 212. Security co-processor module may include PCRs 217, at least one security policy 228, and a security mode 230. In one embodiment, the security mode may specify operation of the security co-processor module in either a normal mode or an enhanced mode. The security policy may specify how the access control space attributes may be used to provide increased security and control of the computing system. In one embodiment, the security co-processor module may include the hardware vendor string 232 stored thereon.

A second I/O bus 220 may comprise a single bus or a combination of multiple buses. The second I/O bus 220 provides communication links between components in system 200. In embodiments of the present invention, additional devices may be coupled to the second I/O bus to provide additional attributes to the security co-processor module. A GPS device 222 may be included to provide current geographic location data. A trusted time device 224 may be included to provide the current trusted time. One or more environmental factors devices 226 may be included to provide the environmental factors data. For example, sensing devices for temperature, acceleration, capacitance, elevation, orientation, or other factors may be included.

Embodiments of the present invention are related to the use of the system 200 as a component in a processing system. According to one embodiment, such processing may be performed by the system 200 in response to processor 202 executing sequences of instructions in memory 206. Such instructions may be read into memory 206 from another computer-readable medium. Execution of the sequences of instructions causes processor 202 to execute processing for the application according to embodiments of the present invention. In an alternative embodiment, hardware circuitry may be used in place of or in combination with software instructions to implement portions of embodiments of the present invention. Thus, the present invention is not limited to any specific combination of hardware circuitry and software.

Figure 3:
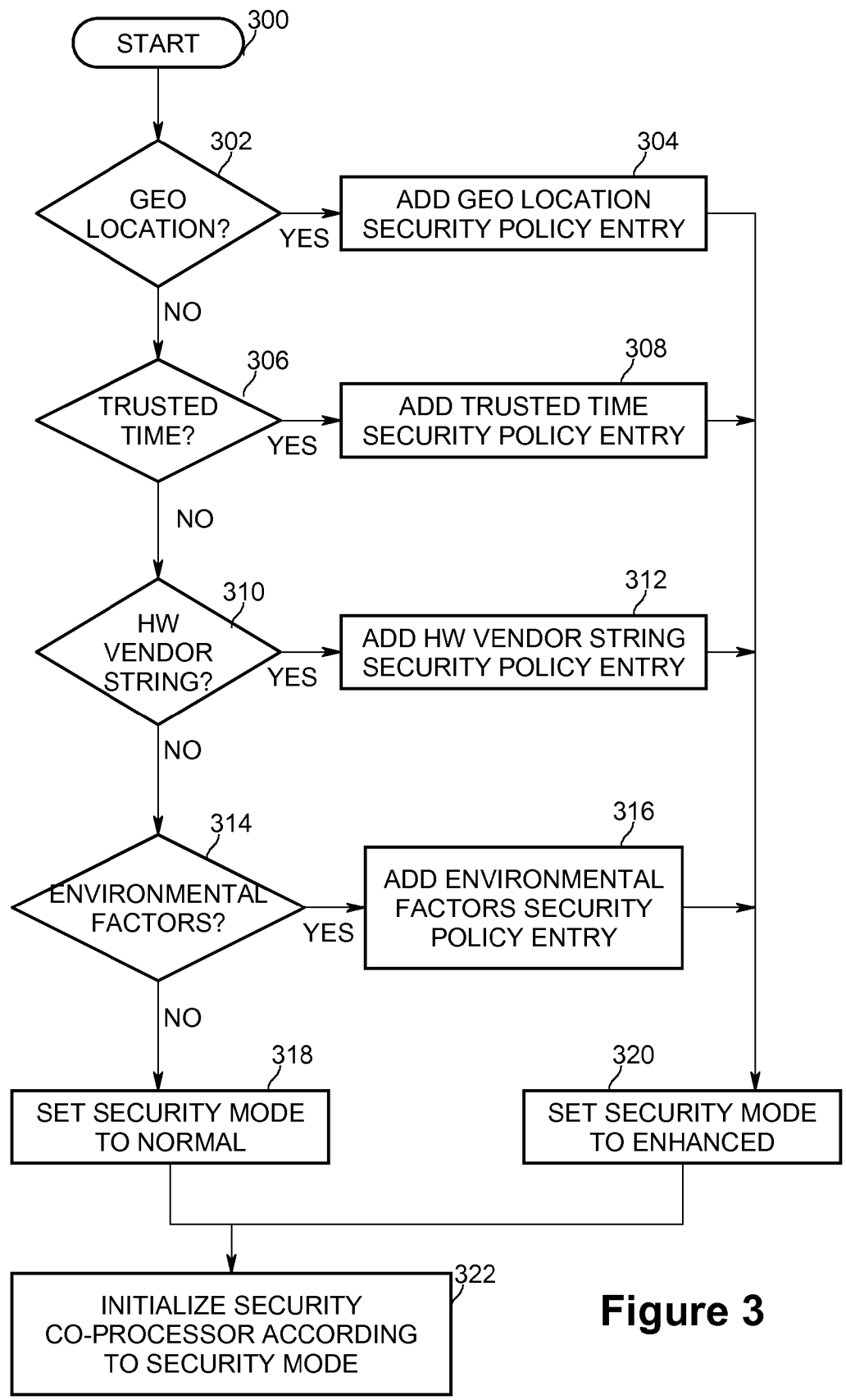
FIG. 3 is a flow diagram illustrating initialization of the security co-processor module according to an embodiment of the present invention.

FIG. 3 is a flow diagram illustrating initialization of the security co-processor module according to an embodiment of the present invention. After start block 300 during computing system initialization processing, at block 302 the security co-processor module determines if obtaining and using geographic location is enabled as a capability for the computing system. If so, at block 304, the security co-processor module adds geographic location as an entry in the security policy 228. If not, the security co-processor module at block 306 determines if obtaining and using trusted time is enabled as a capability for the computing system. If so, at block 308, the security co-processor module adds trusted time as an entry in the security policy. If not, the security co-processor module at block 310 determines if obtaining and using a hardware vendor string is enabled as a capability for the computing system. If so, at block 312, the security co-processor module adds the hardware vendor string as an entry in the security policy. If not, the security co-processor module at block 314 determines if obtaining and using one or more environmental factors is enabled as a capability for the computing system. If so, at block 316, the security co-processor module adds the relevant environmental factors as an entry in the security policy. If any of the geographic location, trusted time, hardware vendor string, or environmental factors is enabled, then the security mode 230 may be set to enhanced at block 320. Otherwise, the security mode may be set to normal. Further initialization processing for the security co-processor module according to the selected security mode may be performed at block 322. The processing in 322 may include, but is not limited to, effecting security-sensitive operations, such as 1) generating a random number; 2) cryptographic signing; 3) cryptographic verification; 4) sealing (encrypt against environment factor); 5) unsealing (decrypting against environment factor); and 6) quote (sign object from remote attestation). In other embodiments, the order of checking for the various attributes may be changed.

Once an additional attribute is enabled, the security co-processor module may reference previously stored specific conditions of usage and acceptable values for that attribute, or may provide the capability to securely set those conditions. For example, the acceptable range of geographic locations at which the computing system may be operated at may be set. In one embodiment, setting of the conditions of usage and acceptable values may be performed after security co-processor module initialization is complete by a system administrator via a secure firmware mechanism.

Figure 4:
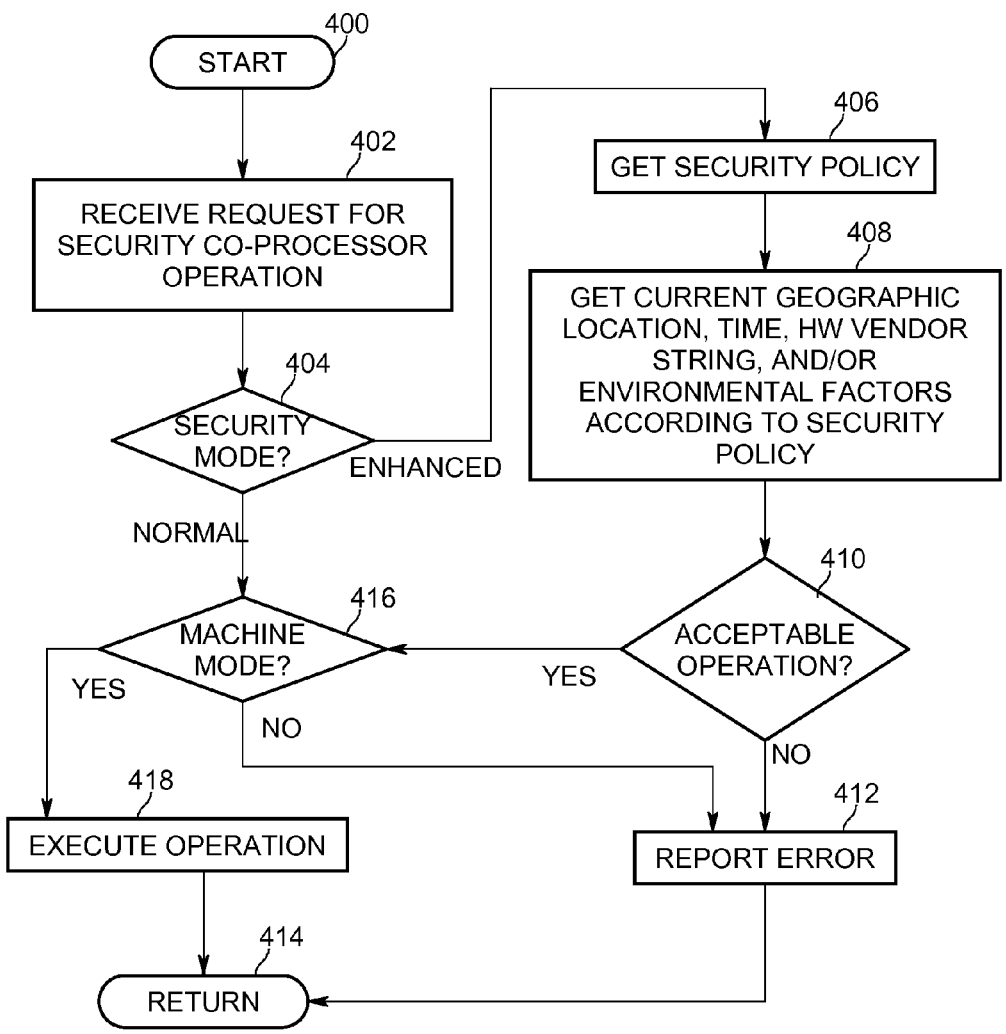
FIG. 4 is a flow diagram illustrating security policy processing of the security co-processor module according to an embodiment of the present invention.

FIG. 4 is a flow diagram illustrating security policy processing of the security co-processor module according to an embodiment of the present invention. Any time after security co-processor module initialization processing is complete, the security co-processor module may receive, after start block 400, a request to perform an operation at block 402. The security co-processor module at block 404 obtains the security mode. If the security mode is normal, then the machine mode may be checked by the security co-processor module at block 416. If the machine mode is acceptable, then the requested operation may be executed by the security co-processor module at block 418, and processing returns to a caller at block 414. However, if the machine mode is not acceptable, then an error may be reported at block 412, and processing returns at block 414.

If the security mode is enhanced, then the security co-processor module gets the security policy at block 406, analyzes the security policy and determines what attributes in addition to machine mode need to be considered prior to executing the operation. At block 408, the security co-processor module gets one or more of the current geographic location, trusted time, hardware vendor string, and/or environmental factors according to the entries in the security policy. The security co-processor module then determines if the requested operation is acceptable based on the attribute data obtained from the various devices of the computing system according to the security policy. That is, the security co-processor module may compare the current values of the attributes to ranges and/or values set in the associated security policy entries for those attributes. If the operation is determined to be acceptable, then processing continues at block 416. If not, an error may be reported at block 412.

Many possible security checks may be made according to embodiments of the present invention. For example, once the current geographic location is obtained, the security co-processor module may determine if the current geographic location is within a prescribed range or boundary. If not, the security co-processor module may deny implementation of certain operations or services on the computing system (for example, a forced shutdown of the system). In another example, if the trusted time does not match other time indicators on the computing system, the security co-processor module may determine that the other time indicators have been tampered with, and take appropriate action. In a further example, if any of the environmental factors are outside of specified ranges, then appropriate actions may be taken. For example, if the temperature is too high, the computing system may be shut down.

In the embodiment shown in FIG. 4, checking the machine mode takes place after checking the other attributes when the security mode is enhanced. In other embodiments, this order of processing may be changed so the other attributes are checked after checking the machine mode.

Thus, by adding additional attributes to extend the locality of the measurement of the computing system beyond machine mode, the security co-processor module may provide better security and further control of the computing system. Since this capability is an integral part of the security co-processor module, which is more difficult to tamper with than the OS or application programs, overall security of the computing system may be improved.

Although the operations described herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, handheld computing devices, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by a machine and that cause the machine to perform any one of the methods described herein. The term "machine readable medium" shall accordingly include, but not be limited to, solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method of expanding locality in a security co-processor module of a computing system comprising:
    setting a security mode of the security co-processor module to an enhanced mode in response to a determination that the computing system provides a capability to obtain the current geographic location;
    receiving a request by the security co-processor module to execute an operation;
    determining the security mode for the security co-processor module;
    when the security mode is set to a normal mode, checking a machine mode of the computing system and executing the requested operation when the machine mode is acceptable;
    when the security mode is set to an enhanced mode, getting a security policy, getting a current geographic location of the computing system and a current trusted time, determining if the requested operation is acceptable according to geographic location and trusted time attribute entries specified in the security policy, the current geographic location, and the current trusted time, and checking the machine mode of the computing system; and
    when the requested operation and machine mode are both acceptable, executing the requested operation.

2. The method of claim 1, further comprising adding an entry to the security policy for geographic location in response to the determination that the computing system provides the capability to obtain the current geographic location.

3. The method of claim 1, further comprising adding an entry to the security policy for trusted time in response to a determination that the computing system provides a capability to obtain the trusted time.

4. The method of claim 1, further comprising adding an entry to the security policy for a hardware vendor string in response to a determination that the computing system provides a capability to obtain the hardware vendor string.

5. The method of claim 4, further comprising getting the hardware vendor string, and determining if the requested operation is acceptable according to the hardware vendor string entry specified in the security policy and the hardware vendor string.

6. The method of claim 5, wherein the hardware vendor string identifies a vendor of a processor of the computing system.

7. The method of claim 1, further comprising adding an entry to the security policy for environmental factors in response to a determination that the computing system provides a capability to sense one or more environmental factors.

8. The method of claim 7, further comprising getting one or more current environmental factors, and determining if the requested operation is acceptable according to the environmental factors entry specified in the security policy and the current one or more environmental factors.

9. The method of claim 8, wherein the one or more environmental factors comprise one or more of temperature, acceleration, capacitance, elevation and orientation of the computing system.

10. The method of claim 1, further comprising shutting down the computing system when the requested operation or machine mode is unacceptable.

11. An article comprising a non-transitory machine readable medium having a plurality of machine instructions that, in response to execution by a security co-processor module within a computing system, cause the security co-processor module to:
set a security mode of the security co-processor module to an enhanced mode in response to a determination that the computing system provides a capability to obtain a current geographic location;
receive a request by the security co-processor module to execute an operation;
determine the security mode for the security co-processor module;
when the security mode is set to a normal mode, check a machine mode of the computing system and execute the requested operation when the machine mode is acceptable;
when the security mode is set to the enhanced mode, get a security policy, get a current geographic location of the computing system and a current trusted time, determine if the requested operation is acceptable according to geographic location and trusted time attribute entries specified in the security policy, the current geographic location, and the current trusted time, and check the machine mode of the computing system; and
when the requested operation and the machine mode both are acceptable, execute the requested operation.

12. The article of claim 11, further comprising instructions that, in response to execution by the security co-processor module, cause the security co-processor module to add an entry to the security policy for geographic location in response to the determination that the computing system provides the capability to obtain the current geographic location.

13. The article of claim 11, further comprising instructions that, in response to execution by the security co-processor module, cause the security co-processor module to add an entry to the security policy for trusted time and set the security mode of the security co-processor module to enhanced in response to a determination that the computing system provides a capability to obtain the trusted time.

14. The article of claim 11, further comprising instructions that, in response to execution by the security co-processor module, cause the security co-processor module to add an entry to the security policy for a hardware vendor string and set the security mode of the security co-processor module to enhanced in response to a determination that the computing system provides a capability to obtain the hardware vendor string.

15. The article of claim 14, further comprising instructions that, in response to execution by the security co-processor module, cause the security co-processor module to get the hardware vendor string, and determine if the requested operation is acceptable according to the hardware vendor string entry specified in the security policy and the hardware vendor string.

16. The article of claim 15, wherein the hardware vendor string identifies a vendor of a processor of the computing system.

17. The article of claim 11, further comprising instructions that, in response to execution by the security co-processor module, cause the security co-processor module to add an entry to the security policy for environmental factors and set the security mode of the security co-processor module to enhanced in response to a determination that the computing system provides a capability to sense one or more environmental factors.

18. The article of claim 17, further comprising instructions that, in response to execution by the security co-processor module, cause the security co-processor module to get one or more current environmental factors, and determining if the requested operation is acceptable according to the environmental factors entry specified in the security policy and the current one or more environmental factors.

19. The article of claim 18, wherein the one or more environmental factors comprise one or more of temperature, acceleration, capacitance, elevation and orientation of the computing system.

20. The article of claim 11, wherein the security co-processor module comprises a trusted platform module (TPM).

21. A security co-processor circuit of a computing system having:
a security mode configured to be settable to a normal mode or an enhanced mode when the computing system provides a capability to obtain a current geographic location or a current trusted time; and
a security policy configured to receive one or more entries associated with increasing security of the computing system;
wherein the security co-processor circuit is configured to:
receive a request to execute an operation;
when the security mode is set to the normal mode, to check a machine mode of the computing system and to execute the requested operation when the machine mode is acceptable;
when the security mode is set to the enhanced mode, to get a current geographic location of the computing system and a current trusted time, to determine if the requested operation is acceptable according to geographic location and trusted time attribute entries specified in the security policy, the current geographic location, and the current trusted time, and to check the machine mode of the computing system; and
when the requested operation and the machine mode are both acceptable, execute the requested operation.

22. The security co-processor circuit of claim 21, wherein the security co-processor circuit is further configured to add an entry to the security policy for geographic location in response to the determination that the computing system provides the capability to obtain the current geographic location.

23. The security co-processor circuit of claim 21, wherein the security co-processor circuit is further configured to add an entry to the security policy for trusted time and to set the security mode to enhanced in response to a determination that the computing system provides the capability to obtain the trusted time.

24. The security co-processor circuit of claim 21, wherein the security co-processor circuit is further configured to add an entry to the security policy for a hardware vendor string and to set the security mode to enhanced in response to a determination that the computing system provides a capability to obtain the hardware vendor string.

25. The security co-processor circuit of claim 24, wherein the security co-processor circuit is further configured to get the hardware vendor string, and to determine if the requested operation is acceptable according to the hardware vendor string entry specified in the security policy and the hardware vendor string.

26. The security co-processor circuit of claim 25, wherein the hardware vendor string identifies a vendor of a processor of the computing system.

27. The security co-processor circuit of claim 21, further wherein the security co-processor circuit is further configured to add an entry to the security policy for environmental factors and to set the security mode to enhanced in response to a determination that the computing system provides a capability to sense one or more environmental factors.

28. The security co-processor circuit of claim 27, wherein the security co-processor circuit is further configured to get one or more current environmental factors, and to determine if the requested operation is acceptable according to the environmental factors entry specified in the security policy and the current one or more environmental factors.

29. The security co-processor circuit of claim 28, wherein the one or more environmental factors comprise one or more of temperature, acceleration, capacitance, elevation and orientation of the computing system.

30. The security co-processor circuit of claim 21, wherein the security co-processor circuit comprises a trusted platform module (TPM).

* * * * *